United States Patent [19]

Ergas

[11] Patent Number: 4,479,183
[45] Date of Patent: Oct. 23, 1984

[54] METHOD OF EDITING SEISMIC TRACES, AS SAY GATHERED BY LARGE MULTICHANNEL COLLECTION SYSTEMS

[75] Inventor: Raymond A. Ergas, Laguna Beach, Calif.

[73] Assignee: Chevron Research Company, San Francisco, Calif.

[21] Appl. No.: 429,358

[22] Filed: Sep. 30, 1982

[51] Int. Cl.³ .......................... G01V 1/28; G01V 1/36
[52] U.S. Cl. ...................................... 364/421; 367/20; 367/41; 367/43; 367/59
[58] Field of Search ..................... 364/421; 367/20, 42, 367/47, 49, 41, 59, 43

[56] References Cited
U.S. PATENT DOCUMENTS

| | | | |
|---|---|---|---|
| 4,203,161 | 5/1980 | Johnson et al. | 364/421 |
| 4,218,766 | 8/1980 | Parrack et al. | 364/421 |
| 4,314,347 | 2/1982 | Stokely | 364/421 |
| 4,316,267 | 2/1982 | Ostrander | 367/68 |
| 4,344,158 | 8/1982 | Landrum, Jr. et al. | 364/421 |

Primary Examiner—Jerry Smith
Assistant Examiner—Karl Huang
Attorney, Agent, or Firm—Harold D. Messner; Edward J. Keeling

[57] ABSTRACT

A method is disclosed for editing seismic traces gathered by large multichannel collection systems using a pattern analysis of the noise spectrum of each trace. Analysis is limited to only a small time window, say the last second of the trace. In that way a minimum number of quantitative variables and mathematical manipulations are required to carry out the invention. On-site as well as off-site, processing of the traces in accordance with the method of the present invention, is contemplated.

18 Claims, 4 Drawing Figures

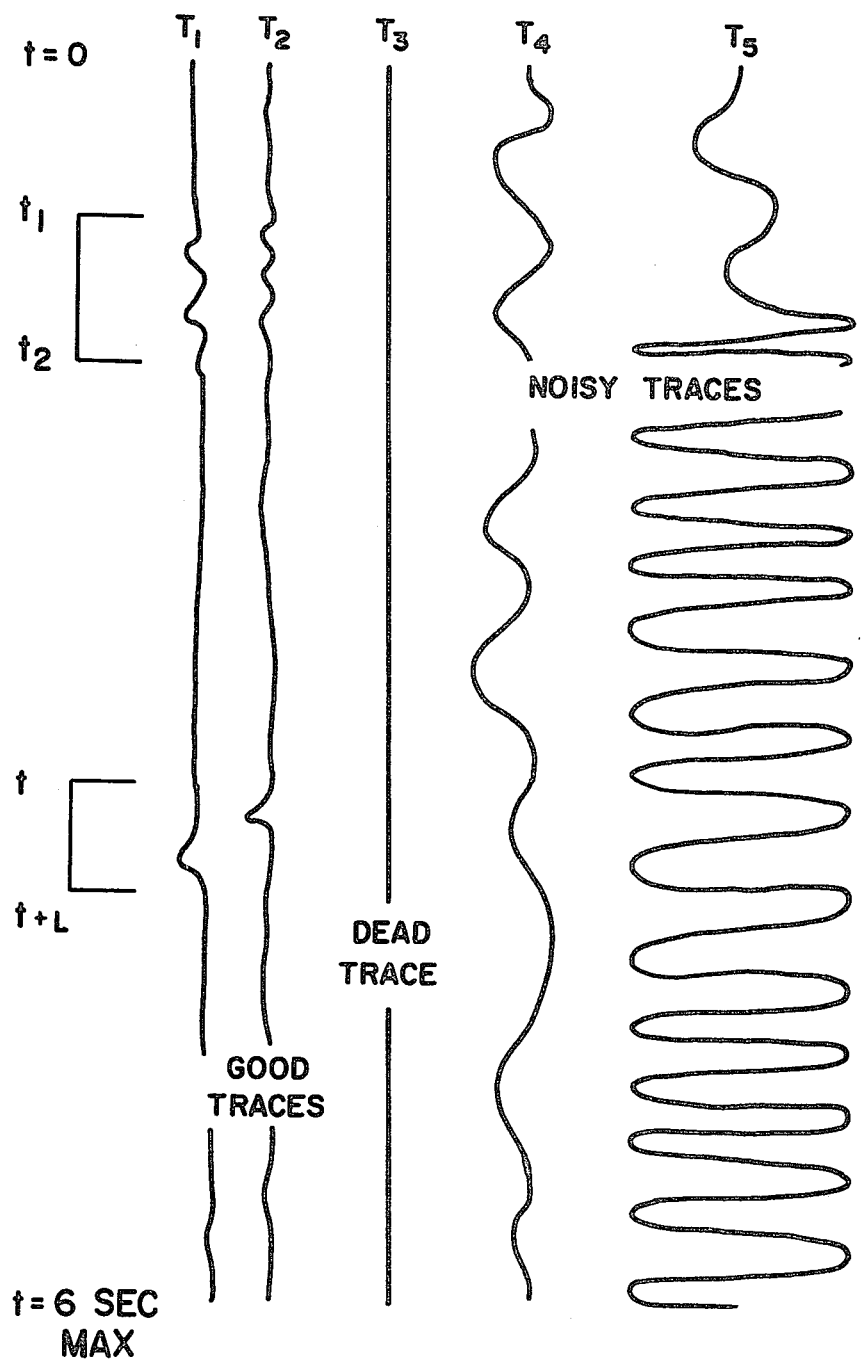
FIG_2

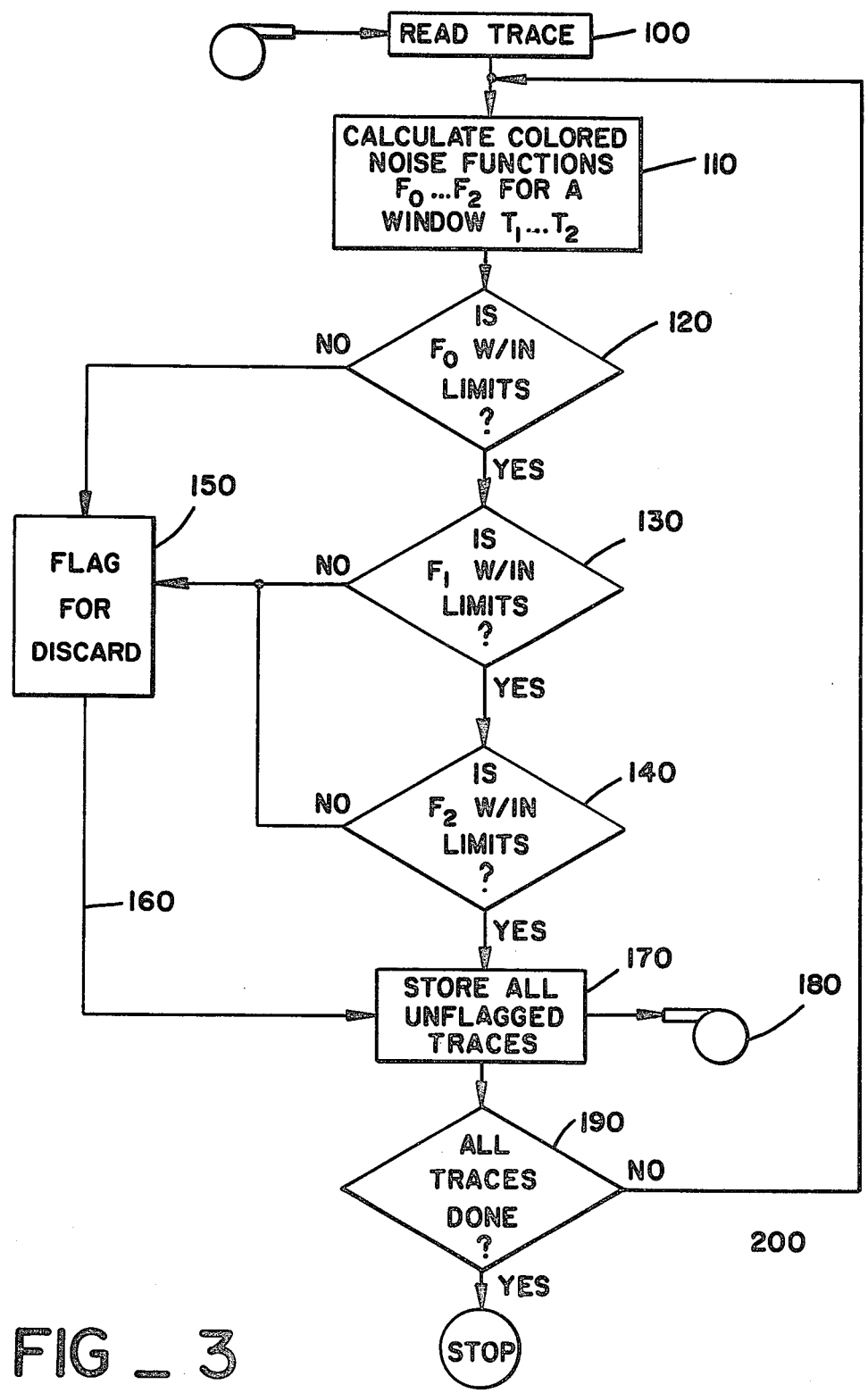
FIG _ 3

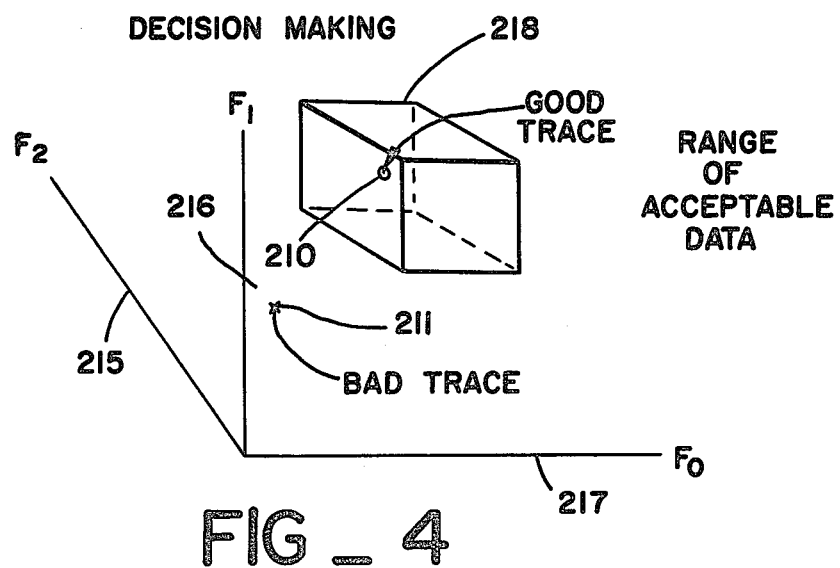
FIG_4

METHOD OF EDITING SEISMIC TRACES, AS SAY GATHERED BY LARGE MULTICHANNEL COLLECTION SYSTEMS

SCOPE OF THE INVENTION

This invention relates to processing of seismic traces collected by large multichannel seismic systems, and more particularly to a stand-alone method of editing such traces so as to quickly and accurately determine if the traces meet minimum processing standards, such standards being based on a surprisingly limited number of easily computed noise spectral characteristics measured only over a small time increment of each trace (say the last second of a six-second trace).

BACKGROUND OF THE INVENTION

In U.S. Pat. No. 4,314,347 for "Seismic Signal Processing Machine and Method for Noise Removal", J. E. Stokely describes a processing method in which the effect of noise bursts in seismic traces are reduced by determining the power level of signals recorded during a seismic survey, over a succession of time windows along the entire trace and then removing those portions of the signal which deviate from the remainder by unacceptable amounts. That is, after the power level of each trace is generated over a time window, the latter is compared to a minimum power level and then zeroed if less than that minimum. Next, an average power level of the remaining traces is found and the aforementioned previously calculated power level is compared to the calculated average for the time window. Comparison is based on statistics: the power level must not exceed a multiple of the standard deviation of the power levels of the remaining traces. That is, if the power level of the trace of interest, exceeds a multiple the average of the remaining traces, it is probably a noise burst and is zeroed. The time window is then incremented and process repeated, until the entire trace has been examined.

While the use of the power spectrum and similar processing methods to eliminate noise bursts in traces may be acceptable in small batch operations, (i.e., in processing say 24- to 48-trace records), it is impractical in processing recordings collected by large multichannel seismic systems, as are now being provided by today's geophysical service companies; i.e., records involving at least 96 traces per record, say preferably between 240 and 1000 channels of data per source activation. This is especially true where prior art signal processing requires full trace treatment (along the entire time extent of each trace) as well as full group treatment (in an orthogonal direction to the time axis, viz., associated with a common group coordinate, a common shot coordinate, a common offset coordinate, etc.)

SUMMARY OF THE INVENTION

The present invention contemplates a method for editing traces collected by large multichannel systems through an analysis of the associated noise spectrum only over a small time increment of each individual trace, say, the last second of the trace using a minimum number of quantitative variables and mathematical manipulations. Hence, field (as well as off-site) processing of the traces in accordance with the present invention, is contemplated. Analysis over the selected time window for each trace, provides a three-variable discriminant function that utilizes three degrees of freedom descriptive of the noise spectrum. One variable is associated with the absolute power spectrum of the noise of the trace; and two others are associated with limits related to the first and second spectral functions, i.e. to the normalized autocorrelations of the waveform that includes the noise spectrum at different values of a multiple time delay operator. Result: an "acceptable" vs. "unacceptable" editing process is advantageously provided based upon unique associated spectral characteristics of the noise spectrum of each trace; hence editing can be carried out with surprising accuracy compared to prior editing methods of which I am aware. Since only the noise spectral characteristics are of interest, the signal-to-noise ratio associated with the time window of interest must be below unity. The time window(s) are of course selected to insure that the above-mentioned editing goal, is achieved.

DEFINITIONS

In the present application, certain key terms are used and, for ease of understanding the present invention, are defined in detail below.

The term "color", as pertaining to the noise spectrum, is used by way of analogy to the visible spectrum. I.e., random noise measured over sufficiently long time periods will contain equal power at all frequencies, and by corollary with the visible spectrum is termed "white" (because a uniform amount of each frequency over the visible spectrum is seen as white light).

The term "skewness" of the noise spectrum relates to amplitude distribution as a function of frequency. Such distribution is also a function of the collection system and the associated environment where the survey occurred. If the latter have non-linear response characteristics these parameters can be imposed upon the collected data, causing the dominant "hue" of the noise spectrum to be shifted from "white" toward another "color" typically "pink". The degree that the system and the environment have imposed such characteristics on the recorded traces (i.e., the degree of shift) can be related directly to the analogous dominant hue associated with the noise spectrum of the traces.

The term "time window" is defined as the time span of each trace over which the amplitude excursions are examined or processed; and The terms "standard values" or "default limits from a standard time window" relate to limits of the associated variables of the noise spectrum which experience, if the limits are exceeded, indicates that the associated traces are unfit for further processing.

DESCRIPTION OF THE DRAWINGS

FIG. 2 is a schematic representation of a series of typical traces provided by the large multichannel collection system of FIG. 1;

FIG. 3 is a flow diagram for editing the traces of FIG. 2 in accordance with the method of the present invention;

FIG. 4 is a schematic representation of the selection criteria as carried out by the flow diagram of FIG. 3.

DETAILED DESCRIPTION OF THE INVENTION

Figure 1:
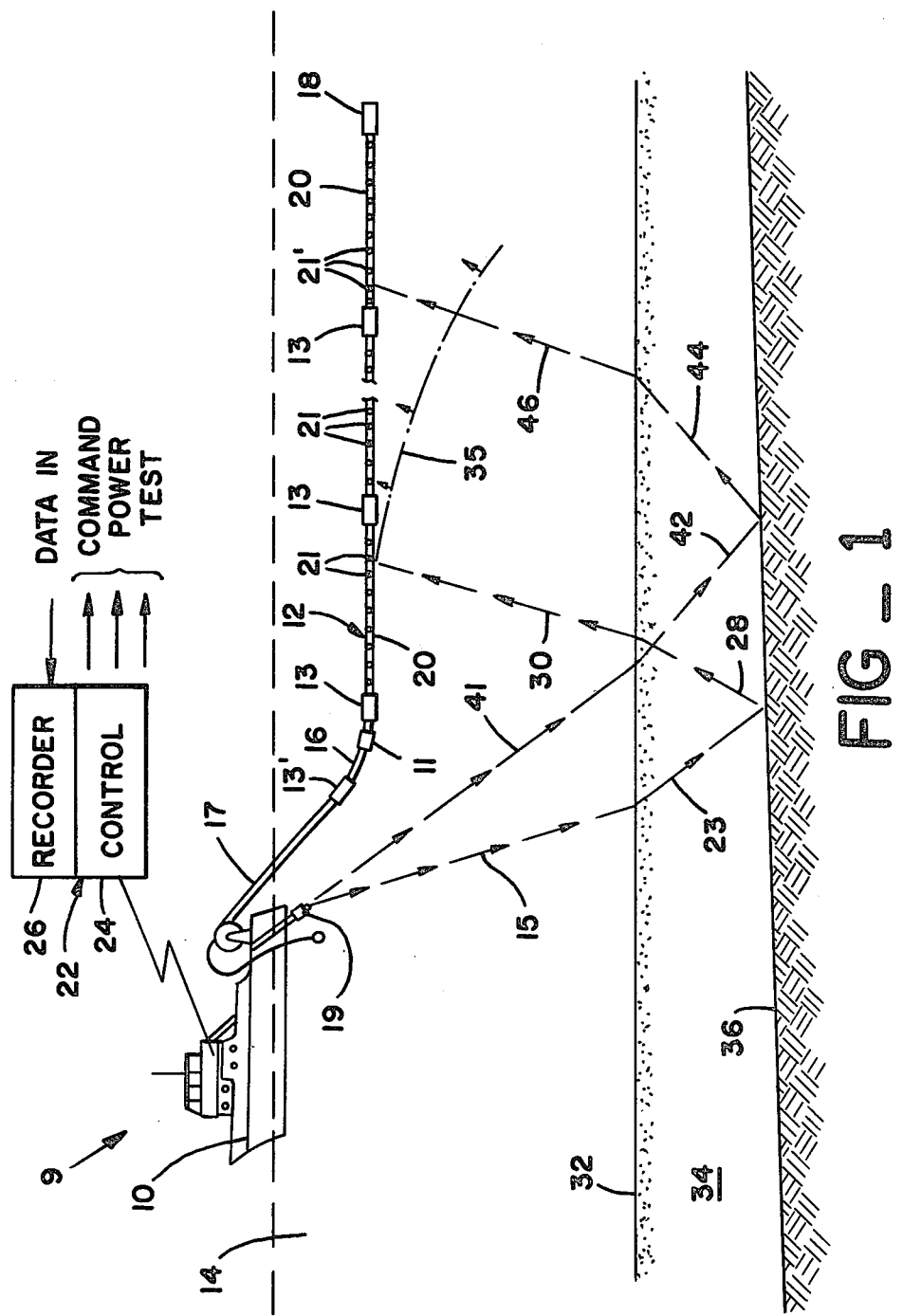
FIG. 1 is an illustrative side elevation of a large-multichannel data acquisition system.

Referring to FIG. 1, a large multichannel exploration system 9 is shown in detail. It includes a vessel 10 which tows a large multichannel seismic cable assembly 12 through a body of water 14. Seismic cable assembly 12 is connected to a shock-absorbing elastic section 16 and to a lead-in 17 and thence to vessel 10. The trailing end of cable assembly 12 is connected to a short terminator section 18. Cable assembly 12 is divided into individual active cable sections 20, each of which is typically about 60 meters long. A connector module 13, contained inside a transceiver unit, connects active cable sections 20 together, electrically and mechanically. A typical seismic cable assembly 12 consists of 50 or more active sections 20, and may have a total length of 10,000 feet or more. Each cable section may contain ten or more sensor units 21, some or all of which constitute a single channel data. The sensors may be hydrophones. The entire cable assembly 12 therefore can produce output signals from 500 or more individual channels.

Signal outputs from sensor units 21 are coupled to a transceiver unit which transmits the signal to a central station 22 on vessel 10. The central station 22 includes control circuitry 24 to transmit interrogation, command, power, and test signals as well as a recording apparatus 26 to receive and record digital data words from the cable assembly 12.

At intervals, as the vessel 10 tows cable assembly 12 through the water, a seismic sound source 19, such as an air gun or a gas exploder, generates acoustic waves in the water. The acoustic waves propagate downwardly through water 14 along ray path 15, impinging upon water bottom 32, where they become refracted along path 23 due to the difference in velocity between water 14 and earth formation 34. Penetrating the earth, the acoustic waves continue along refracted ray path 23 and become reflected from subsurface earth interface 36. The reflected acoustic waves return along ray path 28 through formation and thence continue upwardly through water 14 along ray path 30. The reflected waves are detected by sensor units 21 which convert the reflected acoustic waves to electric signals. The acoustic waves also take other ray paths, such as paths 41, 42, 44, 46, where they are detected by other sensor units such as unit 21', more remote from vessel 10 than sensor units 21. Although similar ray paths may be traced between sound source 19 and each of the 500 or so sensor units in seismic cable assembly 12, only two such paths have been drawn for simplicity. As a result of the periodic activation of the source 19, in association with the forward motion of the vessel 10 through the body of water 14, a series common depth points (as example thereof being the reflection point of interface 36 in FIG. 1, previously described, is defined. Each such common depth point can be associated with a multiplicity of different traces, as typically provided in common depth point collection operations. For example, for a 500 channel array, each such common depth point might be associated with 50 different traces, thus yielding 50 fold coverage per reflection point of the subsurface under survey.

FIG. 2 illustrates—in analog form—a series of traces that could be generated from the digital records at recorder 26 of FIG. 1.

In FIG. 2, note that traces T1, T2, T3, T4 and T5 represent only a small sample of the total number recorded each time source 19 is activated, viz., such traces are only five (5) of, say, the 500 traces recorded per activation of the source 19.

Response characteristics of the associated sensor units 21 within each active cable section 20, should, of course, be identical; for this purpose the seismic crew can pre-test the sensor cable assembly 12 using the apparatus and method set forth in U.S. Pat. No. 4,233,677 for "AUTOMATIC SYSTEM AND METHOD FOR TESTING MARINE STREAMS OF SEISMIC EXPLORATION SYSTEMS", R. J. Brown issued Nov. 11, 1980, assigned to the assignee of the present application.

But system and environmental factors can interact in the manner previously described, such that resulting traces are unsuitable for further processing.

On the left side of the Traces T1–T5 of FIG. 2 is a time scale. Time $t=0$ is self-explanatory corresponding to a time value for initiation of operations. Time $t=tmax$ (say, equal to 6 seconds in actual practice) represents the maximum record time for receiving reflections from deep within the earth. Amplitude excursions along the Traces T1 and T2 indicate events occurring during the collection process, e.g., time at which the source 19 of FIG. 1 was activated (viz., between time $t_1$ and $t_2$); reflections from the horizon 36 all indicated at time $T=t$ and $T=t+L$.

It should be emphasized that the method of the present invention occurs prior to conventional static and dynamic correction of the traces T1, T2 . . . T5. That is to say, the method of the invention is carried out before each trace is corrected for variation of arrival times because of sourcepoint-receiver offset distances, or for variations due to elevational differences of the receivers and sourcepoint, and to weathered layers near the earth's surface.

Traces T1 and T2 are obviously symbolicly suitable for further processing. Traces T3, T4 and T5, however, represent sensor outputs that make such traces unsuitable for further enhancement. In this regard trace T3 is a "dead" trace, being the output of an inoperative cable section 20. Traces T4 and T5 are outputs from cable sections 20 which have experienced extremely large system or environmental noise.

It is immaterial in accordance with the present invention whether editing of the traces T1–T5 of FIG. 2 occurs on-site or on-shore. What is important, is that such editing be capable of being carried out quickly and accurately, keeping in mind the numerous traces generated at recorder 26 within a relatively short time period of collection.

For example, assume that the large multichannel exploration systems 9 of FIG. 1 generates 500 channels of data each time, source 19 is activated. Also, assume a repetition rate of 5 shots per minute, i.e., source 19 is activated each 12 seconds of operation, and that cable assembly 12 comprises 500 sensors in linear relationship. Consequently, 150,000 traces would be recorded every hour of system operation. If each trace is 6 seconds long and the sampling rate for each trace is 1 millisecond, then each of the 150,000 traces will contain 6000 sample points, with each sample point along requiring the performance of several computer operations if conventional editing processes are used in eliminating unsuitable traces. Any additional data manipulations further elongate real time processing requirements.

FIG. 3 illustrates in detail the large multichannel editing process in accordance with the present invention. It represents an overall viewpoint.

Assume that the editing process is carried out on-shore using, e.g., a conventional computing system in which pattern analysis of the noise spectrum occurs as a function of window length per individual trace, i.e., occurs on a trace-by-trace basis over only an incremental time window of the total trace record time. Conventional static and dynamic time corrections are of course omitted.

In FIG. 3 the flow chart sets forth the desired sequence of steps controlling the operation of the digital computer, such as a IBM model 3033 to achieve the desired result of editing signals, viz., in order to provide seismic signals of greater intelligiblity and clarity for geophysical analysis and interpretation. The flow chart sets forth the process steps of the present invention in sufficient detail to enable a computer programmer of ordinary skill in the seismic signal processing art to program a general purpose computer, using a conventional programming language, such as FORTRAN, in accordance with the present invention.

An instruction 100 causes the computer system to read in the data record traces to be processed and the requisite input parameters to control the system. The input parameters include the following parameters: N-defining the location of time window; M-the number of traces in the field data; L-the length of the time window; NB-the number of digital amplitude samples within the time window, equaling the input parameter L divided by the sample interval at which the digital amplitude samples are taken in the seismic data.

In practice the minimum length of the window is 10 wavelengths of the mid-band of the noise spectrum; there is also a critical upper limit; if the window is too long, the process time savings can be lost; if too short, the value can be weighted by individual amplitudes rather than the noise spectrum as a whole. In practice, a one-second length window near the end of a conventional six-second trace has been found to be adequate.

The position of the window is determined by the fact that noise level must exceed that of the reflected signals. Hence, the last second of the trace is preferred, although the initial "mute zone" recording at long offsets can also be used.

After the trace has been scanned over the window i, instruction 110 assumes control and a series of noise spectrum functions, F0, F1, and F2 are generated in sequential order.

Initially, a power level F0 is determined for each trace of the record by squaring the amplitude samples in each trace segment over the common time window i.

Each power level F0 is so determined that it can be later compared with a specified power level (as explained below) and traces which do not exceed the value are then rejected. In effect, such processing prevents low amplitude level signals of little interest from unduly affecting analysis, such as by causing statistical degradation desirable seismic signals of intermediate amplitude due to their prominence in comparison with these low amplitude level signals. Or, such processing excludes traces in which the noise tends to be exceedingly high.

Next, the first and second spectral estimates F1 and F2 of the noise spectrum of each trace, are generated.

Such processing involves determining the estimates of the normalized autocorrelation functions of the trace i over the time window T1–T2 at time shifts or lags of $\pi=1$ sample and $\pi=2$ sample shifts. That is, the delay operator shifts the waveform one and two sample points respectively.

In determining the estimates, the computer correlates the waveform with itself over the window T1–T2, that is to say, cross-productizes the sums of the amplitude samples of the recording at (i) zero time shift (centered of course at the window (i) and (ii) at time shifts $\pi=1$ sample and $\pi=2$ sample in serium divided by the square of the amplitude samples at zero lag, to produce the normalized autocorrelation function F1 and F2 in conventional fashion, see, R. E. Sheriff, "ENCYCLOPEDIA DICTIONARY OF EXPLORATION GEOPHYSICS" SEG, Tulsa, Okla., page 15.

In this regard it should be noted that the first-mentioned step for determining the spectral function F0 by calculating the power level of the particular trace segment, is equivalent to generating the zero lag autocorrelation function of the same waveform in non-normalized fashion. That is to say, the function F0 can also be determined by correlating the waveform segment with itself over the time window T1–T2 via cross-productizing the sums of the zero time shift amplitudes with themselves, and then ignoring the subsequent normalizing step related to dividing the generated numerator by the square of the amplitude samples. Since the spectral functions F1 and F2 must necessarily involve autocorrelation processes, it follows the preferred manner of generating the spectral function F0 is along similar lines, viz., using non-normalized autocorrelation techniques in the manner described.

Instructions 120, 130 and 140 next assume control in serium and the limits of each calculated function F0, F1, and F2 are compared with specified minimum values for standard traces over a standard window based on acceptable minimum level for desired subsequent signal processing. If the calculated values of F0, F1, or F2 do not meet the standards, the trace is flagged via instruction 150 in loop 160. The computer also logs the number of the trace flagged by the instructions 120, 130, 140.

Instructions 170 next assumes control and stores the unflagged traces, say by loading such data onto tape 180. The process terminates when instruction 190 is answered in the affirmative, alternative iteration occurring via loop 200.

Removing the flagged traces from further processing removes data of little interest and thereby prevents confusion of valid data with invalid and unimportant information. That is to say, the autocorrelations functions F1, F2 and F3 after being compared with default values which define acceptable skewness patterns of the noise spectrum, i.e., qualities that indicate that such traces are worth further enhancement.

In this regard, note that the present invention requires that the noise spectrum of the standard trace be defined in a particular manner. That is, the noise spectrum of standard traces, while not containing equal amounts of energy of all frequencies, must define a skewness amplitude v. frequency pattern in which the spectral energy peaks at about 25 Hz and decreases smoothly as a function of increasing frequency up to about 200 Hz. By corollary with the visible spectrum, such skewness pattern could be termed "pink" since the wavelengths of the lower end of the visible spectrum dominate.

FIG. 4 is illustrative of the selection criteria of the present invention in more detail.

Selection is based on establishing classification functions for each trace in the manner previously described. That is to say, two groups of traces (e.g. acceptable trace 210 and unacceptable trace 211) are established by the classification process of the present invention.

It should also be noted that in the preferred application of the method of the present invention, the basis of selection is akin to projecting each individual non-linear function F0, F1, or F2 onto the x, y, z plot of FIG. 4, i.e., relative to axes 215, 216 and 217 and then determining if such functions fall—as a class—within (or without) standard limits of interest. While the latter of course are projectable as a parallelopipid 218 in FIG. 4, in actual fact such limits are prestored in counters within the computing system, as a series of default values. Comparison is hence on a field-by-field basis in pairs of such values.

A program for carrying out the method of the present invention has been designed and is characterized by use of FORTRAN editing statements wherein array limits for the function F0, F1 and F2 are as set forth below.

"EDPARM—Three pairs of data limits for editing traces; each trace having properties outside of these bounds will be excluded from processing. The first pair define the limits of the power of the traces (0-Lag autocorrelation). The second pair of values define the limits of the estimated 1-lag normalized autocorrelation. The third pair of values define the limits of the estimated 2-lag normalized autocorrelation."

Default values for the program are set forth in Table I and were empirically designed.

TABLE I

| Variable | Limits |
|---|---|
| F0 | .025 –.050 |
| F1 | .200 –1.01 |
| F2 | .050 –1.01 |

The above-identified default values are based, in part on discriminant analysis involving testing of several thousand actual field traces. As a consequence of such analysis, the traces were classified into either acceptable or unacceptable categories using a series of scatter plots in which the above limits were produced in conventional fashion.

It has been found that traces from the Gulf region of the United States can be edited with satisfactory results using default values in the ranges set forth above. But traces from other regions and/or involving other recording situations may require a slight deviation from the above limits be fine tuned. But in such cases, experience has also shown that while the range of limits associated with the spectral estimates F1 and F2 usually does not require adjustment, in the case of the limits associated with the estimate of the non-normalized autocorrelation function at zero lag, i.e., the function F0, this is not the case.

Since in the latter circumstance, the power level can vary as a function of environmental and system gathering factors such as water depth, gain setting and other well documented parameters, limits associated with the F0 function may have to be adjusted out the range of default values set forth above. Scatter plots again are helpful in this regard, viz., in re-establishing default values within acceptable processing standards.

The invention is not limited to the above combinations alone, but is applicable to other anomalous circumstances as known to those skilled in the art. It should thus be understood that the invention is not limited to any specific embodiments set forth herein, as variations are readily apparent.

E.g., while on-shore processing is now preferred (because of machine availability) and hence represents the best mode for carrying out the present invention, it is contemplated that at sea processing would be carried out using a microcomputer system such as described in U.S. Pat. No. 4,316,267 for "METHOD FOR INTERPRETING EVENTS OF SEISMIC RECORDS TO YIELD INDICATIONS OF GASEOUS HYDROCARBONS", W. J. Ostrander issued on Feb. 16, 1982 and assigned to the assignee of the present application. It may in such cases be necessary to change the window increment and to adjust line position along the time scale in order that the scanned data contain sufficient noise. Since the S/N ratio of earlier parts of each trace may also be below unity, such parts could be used, although the last second of the 6-second conventional trace is currently preferred, as previously mentioned. Thus, the invention is to be given the broadest possible interpretation within the terms of the following claims.

What is claimed is:

1. A method of examining field traces T0, T1, T2 . . . T associated with a large multichannel seismic collection survey providing channels of data per each source activation, resulting in N fold subsurface common depth point coverage of an earth formation, without either full trace examination occurring along the full time scale of said trace, or without examination of adjacent traces associated with each trace T0 . . . T, comprising
    (i) determining a time window for examining each trace T0 . . . T, said window defining a trace segment thereof containing a plurality of sample points defining an original waveform having a signal-to-noise ratio below unity, wherein noise spectrum characteristics of said original waveform can be identified;
    (ii) generating a series of non-normalized and normalized autocorrelation functions F0, F1 . . . F associated with said noise spectrum over said time window i for said trace T0 . . . T;
    (iii) comparing said generated autocorrelation functions F0, F1 . . . F of step (ii) with a series of similar values associated with a noise spectrum of a standard trace which experience indicates if the limits thereof are exceeded, is unacceptable for further processing;
    (iv) if said generated limits of step (iii) exceed said standard limits of said standard trace, removing said trace from further seismic processing, said removal occurring without the need of examining other time segments of said trace and without examining adjacent traces associated with said trace T0 . . . T.

2. Method of claim 1 in which channels of data collected each occurrence of source activation is in a range of 240 to 1000.

3. Method of claim 1 in which N subsurface fold common depth point coverage is about 50.

4. Method of claim 1 in which said standard autocorrelation values of step (iii) for comparison with values generated in step (ii) over said time window, define noise spectral characteristics in which amplitude decreases with increasing frequency.

5. Method of claim 4 in which said standard autocorrelation values of step (iii) for comparison with said generated values of step (ii) define a "pink" noise spectrum as collary to the visible spectrum.

6. Method of claim 1 in which said series of non-normalized and normalized autocorrelation functions F0 . . . F involve the sub-steps of calculating the power level of each trace over the time window, as well as determining the normalized autocorrelation functions F1 . . . F at different values of a time delay operator controlling the amount of time delay between said original waveform and the delayed waveform as the cross-productized sums of that autocorrelation, are formed.

7. Method of claim 6 in which the sub-step related to determining the normalized autocorrelation functions F1 . . . F are further characterized by generating a first delayed waveform of the normalized autocorrelation function F1 via delaying that waveform one sample point measured at the center of the time window before the cross-productized sums of that waveform and said original waveform, are generated, as well as by producing a second delayed waveform of the normalized autocorrelation function F2 by delaying that waveform two sample points measured at the center of the time window before the cross-productized sums of that autocorrelation are formed.

8. Method of claim 1 in which M channels of data collected each occurrence of source activation is about 500.

9. A method of examining field traces T0, T1, T2 . . . T associated with a large multichannel seismic collection survey providing M channels of data per each source activation N fold subsurface common depth point coverage of an earth formation, without either full trace examination occurring along the full time scale of said trace, or without examination of adjacent traces associated with each trace T0 . . . T, comprising:

(i) determining a time window i for examining each trace T0 . . . T, said window defining a trace segment thereof containing a plurality of sample points defining an original waveform having a signal-to-noise ratio below unity, wherein noise spectrum characteristics of said original waveform can be identified;

(ii) determining skewness of said noise spectrum of trace T0 . . . T as a function of waveform amplitude and frequency, over said time window i;

(iii) comparing said determined skewness of step (ii) with that associated with a noise spectrum of a standard trace which experience indicates, if the limits thereof are exceeded, is unacceptable for further processing, and (iv) if said skewness of step (iii) exceed that of said standard trace, removing said trace from further seismic processing, said removal occurring without the need of examining other time segments of said trace and without examining adjacent traces associated with said trace T0 . . . T.

10. Method of claim 9 in which M channels of data collected each occurrence of source activation is in a range of 240 to 1000.

11. Method of claim 9 in which M channels of data collected each occurrence of source activation is about 50.

12. Method of claim 9 in which said standard skewness of step (iii) used for comparison with that generated in step (ii) over said time window i, defines noise spectral characteristics in which waveform amplitude decreases with increasing frequency.

13. Method of claim 12 in which said standard skewness of step (iii) used for comparison with that generated of step (ii) defines a "pink" noise spectrum as collary to the visible spectrum.

14. Method of claim 9 in which said steps (ii) and (iii) related to determining the skewness of the noise spectrum of each trace over the time window i, involves the sub-steps of calculating the power level of each trace over the time window as well as determining the normalized autocorrelation functions F1 . . . F at different values of a time delay operator controlling the amount of time delay between said original waveform and the delayed waveform as the cross-productized sums of that autocorrelation, as formed.

15. Method of claim 14 in which the sub-step related to determining the normalized autocorrelation functions F1 . . . F are further characterized by generating a first delayed waveform of normalized autocorrelation function F1 via delaying that waveform one sample point measured at the center of the time window before the cross-productized sums of that waveform and said original waveform, are generated, as well as by producing a second delayed waveform of a normalized autocorrelation function F2 by delaying that waveform two sample points measured at the center of the time window before the cross-productized sums of that autocorrelation are formed.

16. The method of claim 9 with the additional steps of processing the remaining traces to enhance seismic events within a series of such traces whereby interpretations of the surveyed earth formation can be accurately indicated.

17. Method of claim 16 in which said additional steps of processing the remaining traces to enhance events therein, includes statically and dynamically correcting said traces whereby said traces are corrected for variation in event arrival time because of (i) sourcepoint-receiver offset distance, and (ii) variations due to elevational locational differences of said receivers and said sourcepoint, as well as variations due to weathered layers near the earth's surface.

18. Method of claim 9 in which N fold common depth point coverage is about 50.

* * * * *